United States Patent [19]

Milroy

[11] 4,056,048

[45] Nov. 1, 1977

[54] EMERGENCY VENTILATION MEANS FOR CONFINED LIVESTOCK AREAS

[76] Inventor: Robert W. Milroy, R. R. 1, Box 168, Manchester, Iowa 52057

[21] Appl. No.: 706,844

[22] Filed: July 19, 1976

[51] Int. Cl.² ............................................. F24F 11/02
[52] U.S. Cl. ............................... 98/41 R; 98/121 A; 49/89; 236/49
[58] Field of Search .............. 236/49; 98/121 A, 41 R; 49/89, 85, 84, 371; 318/159, 160

[56] References Cited

U.S. PATENT DOCUMENTS

| | | | |
|---|---|---|---|
| 302,215 | 7/1884 | Tucker | 98/121 A |
| 328,156 | 10/1885 | Tucker | 98/121 A |
| 2,032,658 | 3/1936 | Gille | 318/160 X |
| 3,611,906 | 10/1971 | Lorenz | 236/49 |
| 3,915,377 | 10/1975 | Sutton, Jr. | 98/33 R |

Primary Examiner—William E. Wayner

[57] ABSTRACT

An emergency ventilation means for confined livestock areas comprised of a plurality of louvered openings which are normally closed by means of electrical motors having a high gearing ratio. When power is lost to the confined livestock area a spring on each set of louvers which is loaded by the electrical motor moving the louver mechanism so as to hold the louvers in a normally closed position causes the louvers to move to an open position so that emergency ventilation will flow through the confined livestock area until power to the normal ventilation means is restored.

2 Claims, 5 Drawing Figures

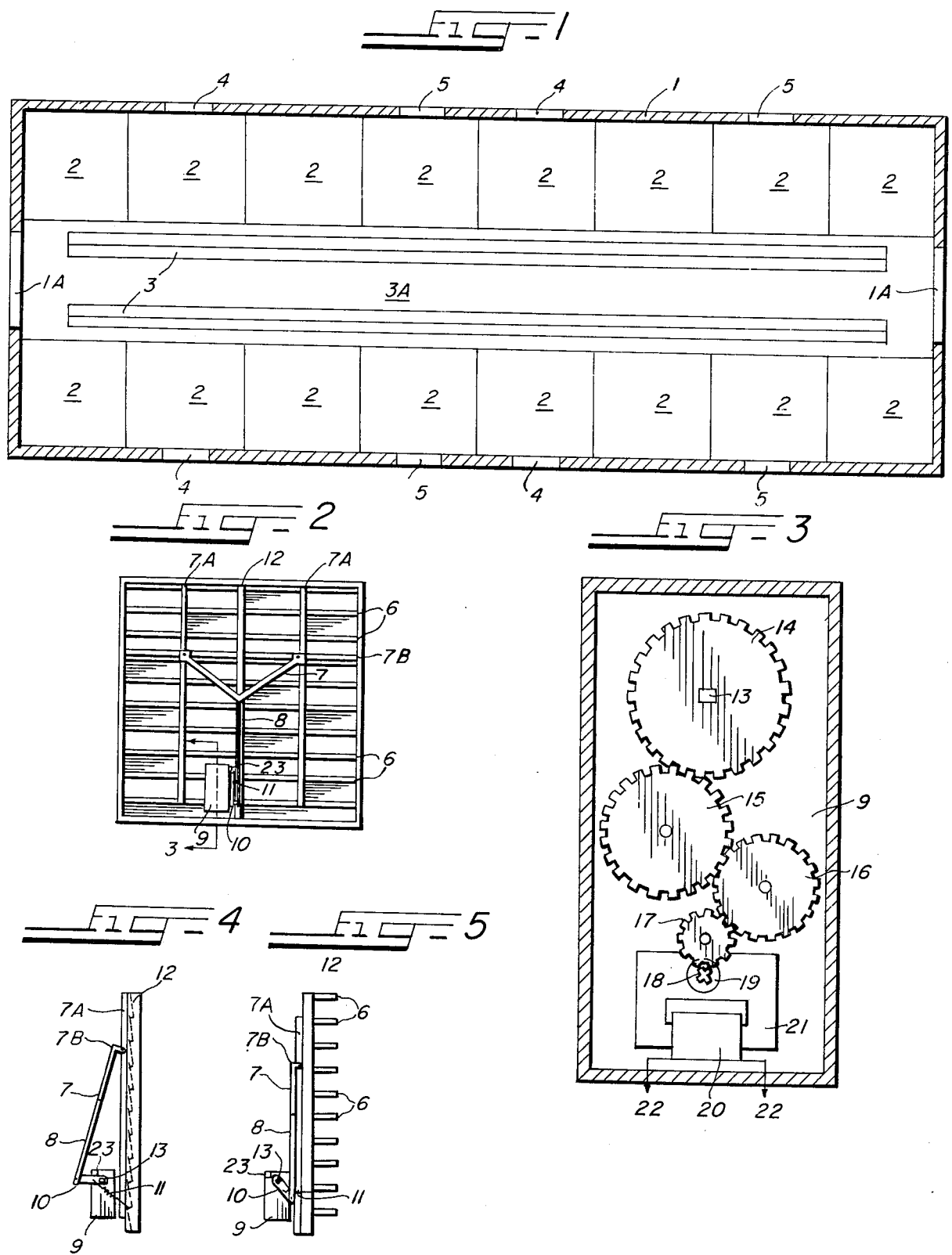

EMERGENCY VENTILATION MEANS FOR CONFINED LIVESTOCK AREAS

BACKGROUND OF THE INVENTION — FIELD OF THE INVENTION

This invention pertains to an emergency ventilation means for confined livestock areas and more particularly to a ventilation means designed to open when electrictity in the confined livestock area has been shut off due to a power failure or other unexpected reason.

BACKGROUND OF THE INVENTION — DESCRIPTION OF THE PRIOR ART

Heretofore confined livestock areas have not had a means to supply emergency air in the case of the loss of electricity to the livestock area. This resulted in the loss of livestock since livestock are generally able to survive only a matter of hours after the loss of ventilation to a confined livestock area. Ventilation is normally provided by fans run by electrical motors and when the motors cease to operate ventilation is lost.

SUMMARY OF THE INVENTION

The ventilation means for confined livestock areas referred to herein provides a means to ventilate a confined livestock area automatically and without the need for persons to oversee the ventilating operation.

It is, therefore, an object of this invention to provide an emergency ventilation means for confined livestock areas which will operate to ventilate the confined livestock area when electrical power has been lost to the confined livestock area.

It is a further object of this invention to provide an emergency ventilation means to confined livestock areas which will remain in a closed position under normal operation.

It is a further object of this invention to provide an emergency ventilation means for confined livestock areas which will make it possible for the livestock to survive upon loss of electrical power to the confined livestock area.

Further objects and advantages of this invention will become apparent from the following drawing, description and claims.

BRIEF DESCRIPTION OF THE DRAWING

FIG. 1 is a plan view of a confined livestock area.
FIG. 2 is a front view of the emergency ventilation means.
FIG. 3 is an enlarged sectional view of the motor and gearing arrangement used on the emergency ventilation means, taken on line 3—3 of FIG. 2.
FIG. 4 is a side view of the ventilation means showing the louvers in a closed position and
FIG. 5 is a side view of the ventilation means showing the louvers in an open position.

DESCRIPTION OF THE PREFERRED EMBODIMENT

Referring now to the drawing, the confined livestock area is a barn 1 which has livestock pens 2 located therein and feeding troughs 3 in a center aisle 3A. Doors 1A are located at opposite ends of the center aisle 3A. Spaces 4 have fans (not shown) located therein for circulating air throughout the barn 1. Spaces 5 have located therein the emergency ventilation means shown in FIG. 2. The emergency ventilation means is comprised of louvers 6 having attached thereto a yoke 7 through rods 7A and pivot means 7B. The yoke 7 has an arm 8 attached to a motor 9 by means of a strip 10. A spring 11 is fastened between the strip 10 and a center piece 12. The strip 10 has one end thereof fastened to the center peg 13 of a gear 14 located in the motor 9. The gear 14 is meshed with other gears, 15, 16 and 17 of the motor 9. The gear 17 meshes with a gear 18 on the armature 19 of the motor 9. An electrical coil 20 surrounds a portion of the field strips 21. Wires 22 lead from the coil 20 to an electrical source. A stop 23 is located on the motor 9.

In operation the louvers 6 of the emergency ventilation means are normally closed. The fans (not shown) located in the spaces 4 in the barn 1 are normally running to ventilate the barn 1. The livestock (not shown) are located in the pens 2 and the confined livestock area is used for feeding as in troughs 3 and there are manure disposal units (not shown) so that the animals never leave the confined livestock area from the time they are first placed in the barn 1 until the time they are ready to be shipped to market. As a result the animals (not shown) create a good deal of heat in the confined livestock area through their body temperatures which must be dissipated by ventilation, using the fans (not shown) that fit into the space 4. The electrical power source is so connected through the wires 22 to the coil 20 so that the armature 19 turns the gears 14 through 18. The motor 9 turns the strip 10 attached to the center peg 13 approximately a quarter revolution of the gear 14. The spring 11 is pulled by said quarter revolution of turning into a tension position and the louvers 6 are, thus, held closed as shown in FIG. 4. A stop 23 prevents further turning of the strip 10. When the electrical power is lost the armature 19 no longer through the gears 14 through 18 holds the louvers 6 in the closed position and the spring 11 thus returns the strip 10 to a position so that the louvers will be opened as shown in FIGS. 2 and 5. This then creates ventilation by natural air breezes through the spaces 5 in the barn 1 and as an emergency means will give ventilation to the confined livestock area until the power sorce can be restored at which time louvers 6 return to their normal closed position.

I claim:
1. An emergency ventilation means for confined livestock areas comprised of a set of louvers fastened together in moving relation to each other, an electrical motor having a high gearing ratio, an arm connected to the louvers, a strip connecting the arm to the electrical motor, a spring loading between the strip and a frame for the louvers to immediately open the louvers when electrical power is lost, the electrical motor having a stop thereon to prevent the electrical motor from distorting the louvers as the louvers reach a normally closed position.

2. A plurality of the emergency ventilation means of claim 1 used in connection with a confined livestock area having a plurality of ventilation means designed to run from electrical power, the electrical power source for the ventilation means being the same as the electrical power source for the emergency ventilation means.

* * * * *